(12) United States Patent
Vandermey (10) Patent No.: US 8,847,433 B2
(45) Date of Patent: Sep. 30, 2014

(54) APPARATUS FOR PROVIDING POWER TO A MULTIPOLE IN A MASS SPECTROMETER

(75) Inventor: John Vandermey, Georgetown (CA)

(73) Assignee: DH Technologies Development Pte. Ltd., Singapore (SG)

(*) Notice: Subject to any disclaimer, the term of this patent is extended or adjusted under 35 U.S.C. 154(b) by 775 days.

(21) Appl. No.: 12/945,997

(22) Filed: Nov. 15, 2010

(65) Prior Publication Data

US 2011/0278946 A1    Nov. 17, 2011

Related U.S. Application Data

(60) Provisional application No. 61/261,407, filed on Nov. 16, 2009.

(51) Int. Cl.
*H01F 27/42* (2006.01)
*H01J 49/42* (2006.01)
*H01J 49/02* (2006.01)
*H02M 7/48* (2006.01)
*H01F 19/04* (2006.01)

(52) U.S. Cl.
CPC .............. *H02M 7/48* (2013.01); *H01J 49/422* (2013.01); *Y02B 70/1441* (2013.01); *H01J 49/022* (2013.01); *H01F 19/04* (2013.01); *H02M 2007/4815* (2013.01)
USPC .................. 307/104; 307/39; 307/82; 307/87; 307/149; 455/280; 324/322

(58) Field of Classification Search
USPC .......... 250/283, 290; 324/322, 300, 311, 312, 324/313, 314, 318; 335/219; 128/653.5; 455/280
See application file for complete search history.

(56) References Cited

U.S. PATENT DOCUMENTS

| | | | |
|---|---|---|---|
| 4,703,190 A * | 10/1987 | Tamura et al. | 307/2 |
| 4,755,670 A | 7/1988 | Syka et al. | |
| 5,243,289 A * | 9/1993 | Blum et al. | 324/322 |
| 6,075,244 A | 6/2000 | Baba et al. | |
| 7,840,196 B2 * | 11/2010 | Kayano | 455/125 |
| 8,030,613 B2 * | 10/2011 | Makarov et al. | 250/292 |
| 2005/0127291 A1 | 6/2005 | Kawato | |

(Continued)

FOREIGN PATENT DOCUMENTS

| | | |
|---|---|---|
| EP | 1269519 B1 | 6/2004 |
| EP | 1153474 B1 | 10/2007 |

OTHER PUBLICATIONS

PCT Application No. PCT/CA2010/001826 International Search Report mailed Feb. 17, 2011.

(Continued)

*Primary Examiner* — Rexford Barnie
*Assistant Examiner* — Jagdeep Dhillon (57) ABSTRACT

An apparatus for providing power to a multipole in a mass spectrometer is provided. The apparatus comprises a first resonant LC circuit; at least one inductor for forming a second resonant LC circuit with the multipole, the second resonant LC circuit connected in cascade with the first resonant LC circuit, when the at least one inductor is connected to the multipole; an RF power source for providing an RF signal; and a step-up transformer connected in parallel to the RF power source on a primary side and the first resonant LC circuit on a secondary side, the step-up transformer providing voltage gain for the RF signal thereby reducing the loaded Q of the resonant LC circuits.

16 Claims, 8 Drawing Sheets

(56) References Cited

U.S. PATENT DOCUMENTS

| | | |
|---|---|---|
| 2006/0016981 A1 | 1/2006 | Park |
| 2007/0018629 A1 | 1/2007 | Potvin et al. |
| 2008/0048112 A1 | 2/2008 | Makarov et al. |

OTHER PUBLICATIONS

PCT Application No. PCT/CA2010/001826 Written Opinion mailed Feb. 17, 2011.

International Search Report, date of mailing on Feb. 17, 2011, from the International Patent Application No. PCT/CA2010/001826, filed on Nov. 15, 2010.

Written Opinion, date of mailing on Feb. 17, 2011, from the International Patent Application No. PCT/CA2010/001826, filed on Nov. 15, 2010.

International Preliminary Report on Patentability, date of issuance on May 22, 2012, from the International Patent Application No. PCT/CA2010/001826, filed on Nov. 15, 2010.

* cited by examiner

APPARATUS FOR PROVIDING POWER TO A MULTIPOLE IN A MASS SPECTROMETER

FIELD

The specification relates generally to mass spectrometers, and specifically to an apparatus for providing power to a multipole in a mass spectrometer.

BACKGROUND

Figure 2:
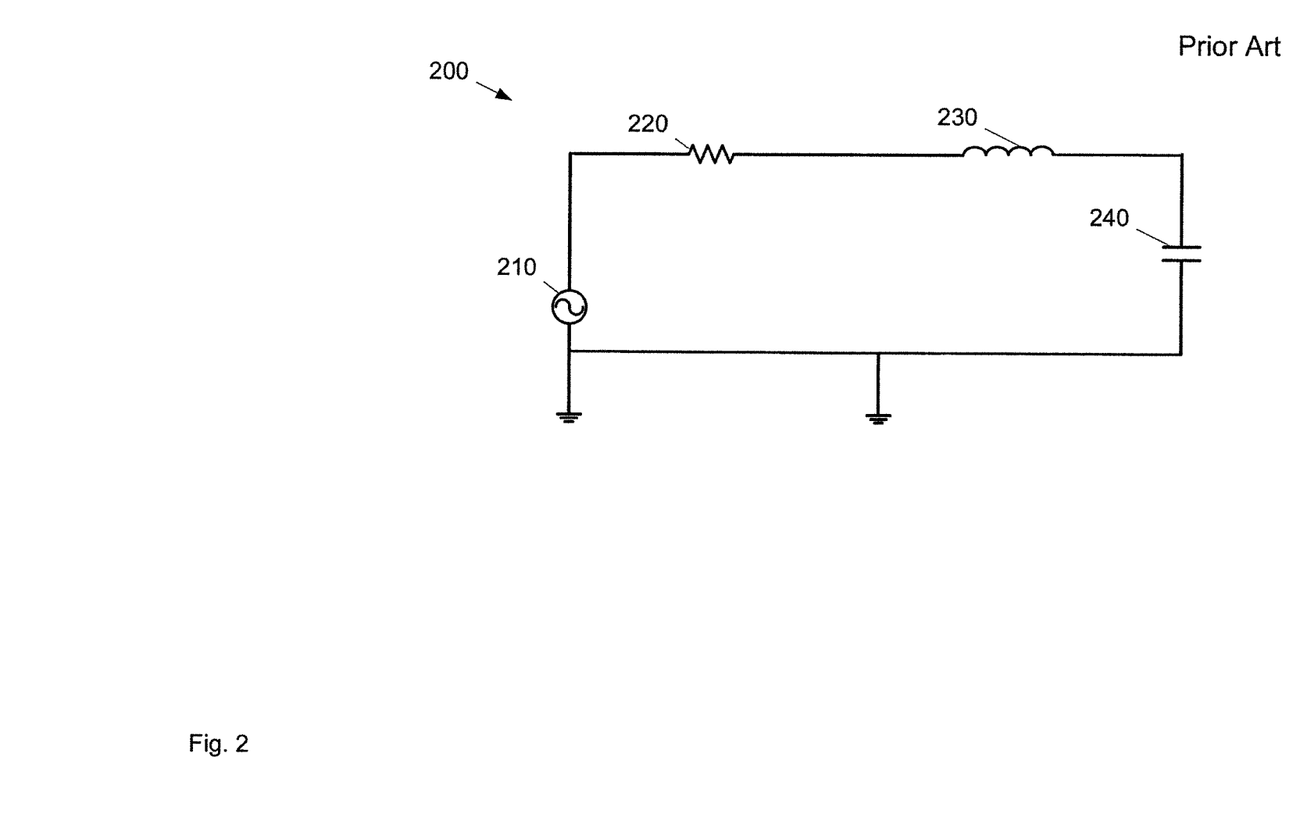
FIG. 2 depicts a circuit of a power supply for a quadrupole in a mass spectrometer, according to the prior art.
Figure 4:
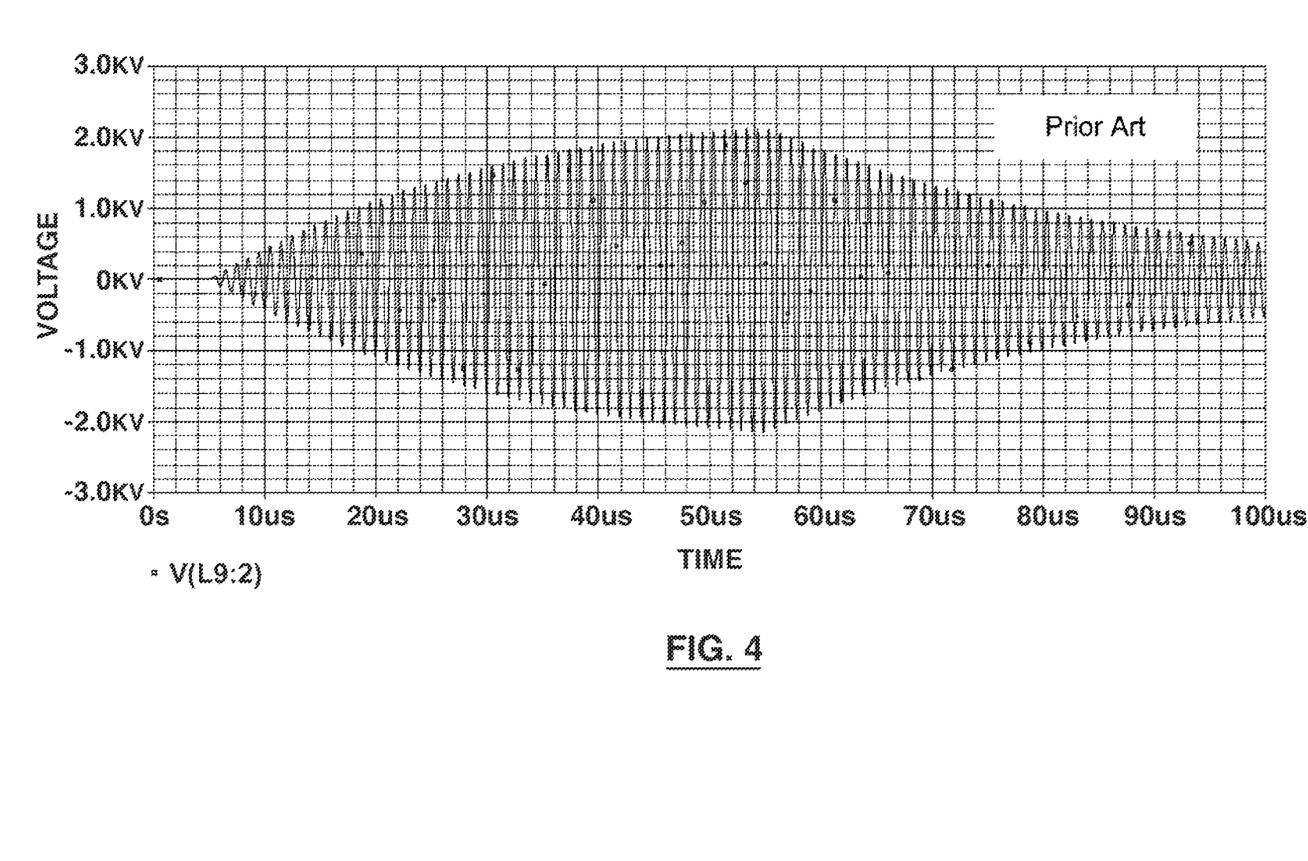
FIG. 4 depicts a response curve of the circuit of FIG. 2, according to the prior art.

When providing power to a multipole (e.g. a quadrupole mass filter) in a mass spectrometer, a fast response time is generally desirable. Most quadrupole power supplies provide power by way of a resonant LC circuit. A resonant LC circuit, according to the prior art, is depicted in FIG. 2, and includes an RF power supply and an inductor L1, the quadrupole providing the capacitance C1 for the resonant LC circuit. However, such a simple circuit provides a relatively slow response, both in bringing the quadrupole to full power, and in turning off power. For example, FIG. 4 depicts a model of the response of the circuit of FIG. 2. From FIG. 4, it is understood that response time can be as high as 40-50 µs for the circuit of FIG. 2 to ramp a quadrupole up to full power; furthermore, the response time is greater than 40 µs to ramp power back down. Such long response times are not desirable as the speed of ramping generally determines how quickly a quadrupole can eject and/or filter ions. This can also affect the speed at which the mass spectrometer provides analytical results as the faster ions are ejected from a quadrupole, the faster they reach an analysis component of the mass spectrometer, e.g. a Time-of-Flight (ToF) detector. In addition, the ramp speed also generally affects the accuracy of ejection/filtering. Furthermore, as quadrupoles are operated in the kV range (e.g 1-5 kV voltages), increasing ramp speed of RF becomes challenging.

SUMMARY

A first aspect of the specification provides an apparatus for providing power to a quadrupole in a mass spectrometer. The apparatus comprises a first resonant LC circuit. The apparatus further comprises at least one inductor for forming a second resonant LC circuit with the quadrupole, the second resonant LC circuit connected in cascade with the first resonant LC circuit, when the at least one inductor is connected to the quadrupole. The apparatus further comprises an RF power source for providing an RF signal. The apparatus further comprises a step-up transformer connected in parallel to the RF power source on a primary side and the first resonant LC circuit on a secondary side, the step-up transformer providing voltage gain for the RF signal thereby reducing the loaded Q of the resonant LC circuits.

The apparatus can further comprise at least one further resonant LC circuit between the first resonant LC circuit and the second resonant LC circuit, the first resonant LC circuit, the at least one further resonant LC circuit, and the second resonant LC circuit connected in cascade, when the at least one inductor is connected to the quadrupole.

A capacitor in the second resonant LC circuit can comprise the quadrupole, when the at least one inductor is connected to the quadrupole.

The apparatus can further comprise a DC power source connected to a non-grounded input to the step-up transformer on the primary side to provide a DC offset to the RF signal.

The RF power source can comprise an integrated apparatus (IC) power source.

The RF power source can be operable in a range of substantially 500 kHz to 5 MHz.

The voltage gain of the apparatus can be substantially between 50 and 500.

The loaded $Q=((Vg^{1/n})-1)^{1/2}$ and Vg is the voltage gain for the apparatus.

The multipole can comprise at least one of a quadrupole, a hexapole and an octopole.

A second aspect of the specification provides a method for providing power to a quadrupole in a mass spectrometer. The method comprises controlling a circuit to produce an RF signal. The circuit comprises: a first resonant LC circuit; at least one inductor for forming a second resonant LC circuit with the quadrupole, the second resonant LC circuit connected in cascade with the first resonant LC circuit, when the at least one inductor is connected to the quadrupole; an RF power source for providing an RF signal; and a step-up transformer connected in parallel to the RF power source on a primary side and the first resonant LC circuit on a secondary side, the step-up transformer providing voltage gain for the RF signal thereby reducing the loaded Q of the resonant LC circuits.

The circuit can further comprise at least one further resonant LC circuit between the first resonant LC circuit and the second resonant LC circuit, the first resonant LC circuit, the at least one further resonant LC circuit, and the second resonant LC circuit connected in cascade, when the at least one inductor is connected to the quadrupole.

A capacitor in the second resonant LC circuit can comprise the quadrupole, when the at least one inductor is connected to the quadrupole.

The method can further comprise controlling a DC power source connected to a non-grounded input to the step-up transformer on the primary side to provide a DC offset to the RF signal .

The RF power source can comprise an integrated apparatus (IC) power source.

The method can further comprise operating the RF power source in a range of substantially 500 kHz to 5 MHz.

The voltage gain of the circuit can be substantially between 50 and 500.

The loaded $Q=((Vg^{1/n})-1)^{1/2}$ and Vg is the voltage gain for the circuit.

The multipole can comprise at least one of a quadrupole, a hexapole and an octopole.

BRIEF DESCRIPTIONS OF THE DRAWINGS

Embodiments are described with reference to the following Figs., in which.

DETAILED DESCRIPTION OF THE EMBODIMENTS

Figure 1:
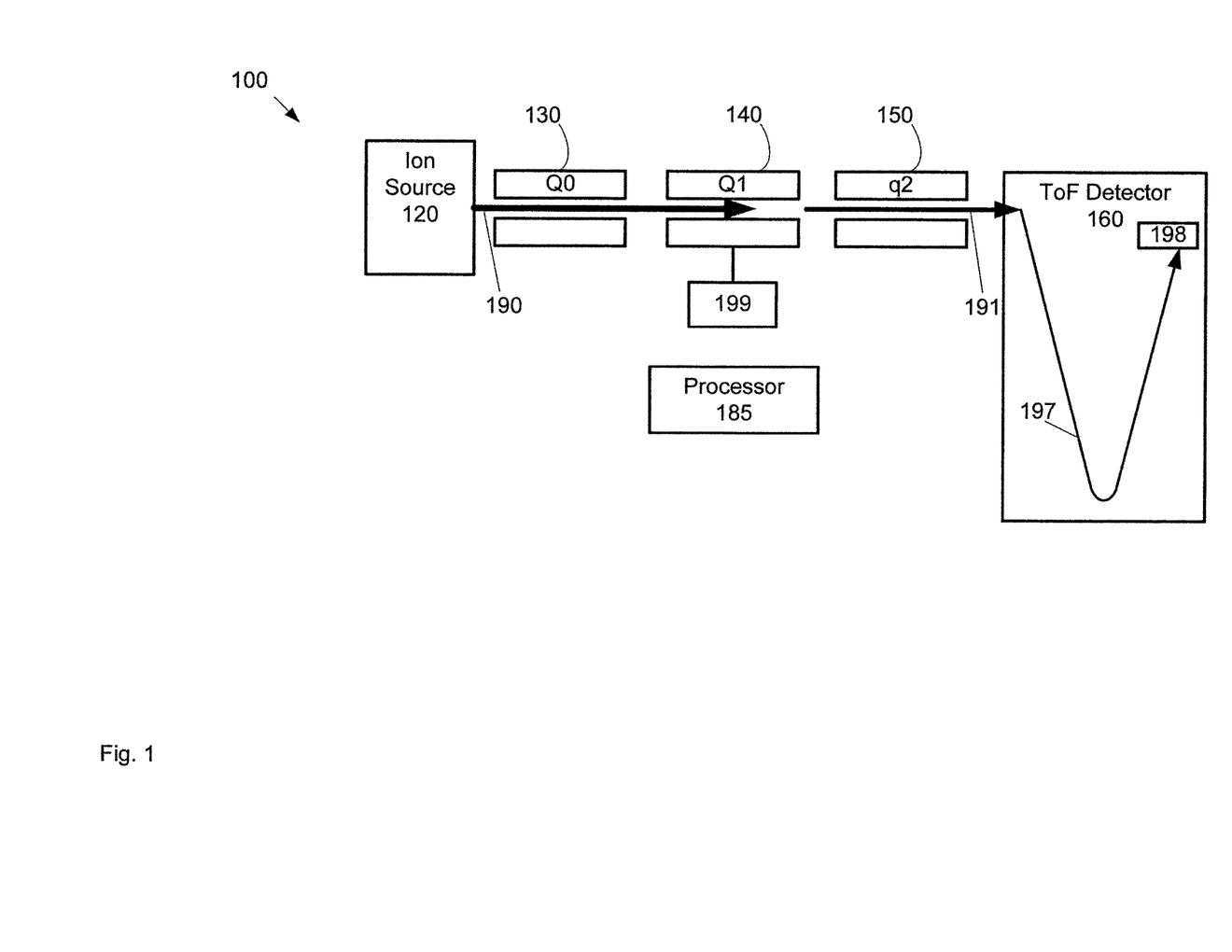
FIG. 1 depicts a mass spectrometer, according to non-limiting embodiments

FIG. 1 depicts a mass spectrometer, the mass spectrometer comprising an ion guide 130, a quadrupole 140, a collision cell 150 (e.g. a fragmentation module) and a time of flight (ToF) detector 160, mass spectrometer 100 enabled to transmit an ion beam from ion source 120 through to ToF detector 160. In some embodiments, mass spectrometer 100 can further comprise a processor 185 for controlling operation of mass spectrometer 100, including but not limited to controlling ion source 120 to ionise the ionisable materials, and controlling transfer of ions between modules of mass spectrometer 100. In operation, ionisable materials are introduced into ion source 120. Ion source 120 generally ionises the ionisable materials to produce ions 190, in the form of an ion beam, which are transferred to ion guide 130 (also identified as Q0, indicative that ion guide 130 take no part in the mass analysis). Ions 190 are transferred from ion guide 130 to quadrupole 140 (also identified as Q1), which can operate as a mass filter, and which can be controlled to filter and eject ions 191, as described below. Ejected ions 191 can then be transferred to collision cell 150 (also identified as q2) for fragmentation. It is understood that collision cell 150 can comprise any suitable multipole, including but not limited to a quadrupole, a hexapole, and an octopole. Ions 191 are then transferred to ToF detector 160 for production of mass spectra. In doing so, ions 191 follow a path 197 through ToF detector 160 and impinge on a suitable detector surface 198, the time of flight it takes to travel path 197 being proportional to the square root of the mass to charge ratio of an ion. In some embodiments, collision cell 150 comprises a quadrupole, similar to quadrupole 140, which can be controlled to filter and eject ions 191.

Furthermore, while not depicted, mass spectrometer 100 can comprise any suitable number of vacuum pumps to provide a suitable vacuum in ion source 120, ion guide 130, quadrupole mass filter 140, collision cell 150 and/or ToF detector 160. It is understood that in some embodiments a vacuum differential can be created between certain elements of mass spectrometer 100: for example a vacuum differential is generally applied between ion source 120 and ion guide 130, such that ion source 120 is at atmospheric pressure and ion guide 130 is under vacuum. While also not depicted, mass spectrometer 100 can further comprise any suitable number of connectors, power sources, RF (radio-frequency) power sources, DC (direct current) power sources, gas sources (e.g. for ion source 120 and/or collision cell 150), and any other suitable components for enabling operation of mass spectrometer 100.

In particular mass spectrometer comprises an apparatus 199 for providing RF power to a quadrupole in mass spectrometer 100, for example at least one of quadrupole 140 and collision cell 150. Apparatus 199 enables at least one of quadrupole 140 and collision cell 150 to be controlled to filter and eject ions 191, as will be described below. However, quadrupole 140 and/or collision cell 150 are understood to be merely exemplary and in other embodiments, apparatus 199 can provide power to any suitable multipole in a mass spectrometer (including but not limited to a quadrupole, hexapole and octopole) which features two sets of interconnected electrodes connected with apparatus 199. For example, multipole ion guides are commonly powered in a manner similar to quadrupoles, with two sets of electrodes, for example, an "A" set and a "B" set. Voltages on such A and B sets are similar to voltages on cross-connected electrode pairs in a quadrupole. For example, in embodiments where a multipole comprises a hexapole, each of the A and B sets comprise three electrodes in each set, with each electrode in set A paired with an electrode from set B. Hence, quadrupole 201 is understood to be merely a non-limiting example of a type of a multipole, and in other embodiments, any suitable multipole can be controlled by apparatus 199 to filter and eject ions.

In the prior art, apparatus 199 is replaced with a circuit 200 depicted in FIG. 2, in which an RF (radio-frequency) power supply 210 provides power to quadrupole 140 via a resonant LC circuit including a resistor 220, an inductor 230, and a capacitance 240 provided by the capacitance of quadrupole 140, power supply 210, resistor 220, inductor 230, and capacitance 240 connected in series. Such a circuit can include further resonant LC circuits connected in cascade, between resistor 220 and inductor 230. It is understood that if the number of LC circuits is n, then the set of equations which enables the values of the resistor, inductors and capacitances to be determined are as follows:

$$L_n = 1/(C_n * (2*\pi*F)^2) \qquad \text{Equation 1}$$

$$C_{n-1} = V_g^{2/n} * C_n \qquad \text{Equation 2}$$

$$L_{n-i} = L_n/V_g^{2n} \qquad \text{Equation 3}$$

$$Q = ((V_g^{1/n})^2 - 1)^{1/2} \qquad \text{Equation 4}$$

$$R1 = 2*\pi*F*L_1/Q \qquad \text{Equation 5}$$

where:
Vg is the voltage gain of the circuit;
Q is the "loaded Q" of the circuit;
F is the centre frequency of an RF power supply supplying the RF signal for the circuit, such as power supply 210;
Cn=capacitance of the nth capacitor including the capacitance of the quadrupole
Ln=inductance of the nth inductor; and
R1=resistance of resistor 220.

In general it is understood that circuit 200 as a value of n=1, and hence the resistance of resistor 220, and the impedance of inductor 230, and the loaded Q, can be calculated using Equations 1 to 5 and/or any suitable circuit modelling package, given capacitance 240 (i.e. the capacitance of the quadrupole), the centre frequency of power supply 210 and the desired gain $V_g$.

Figure 3:
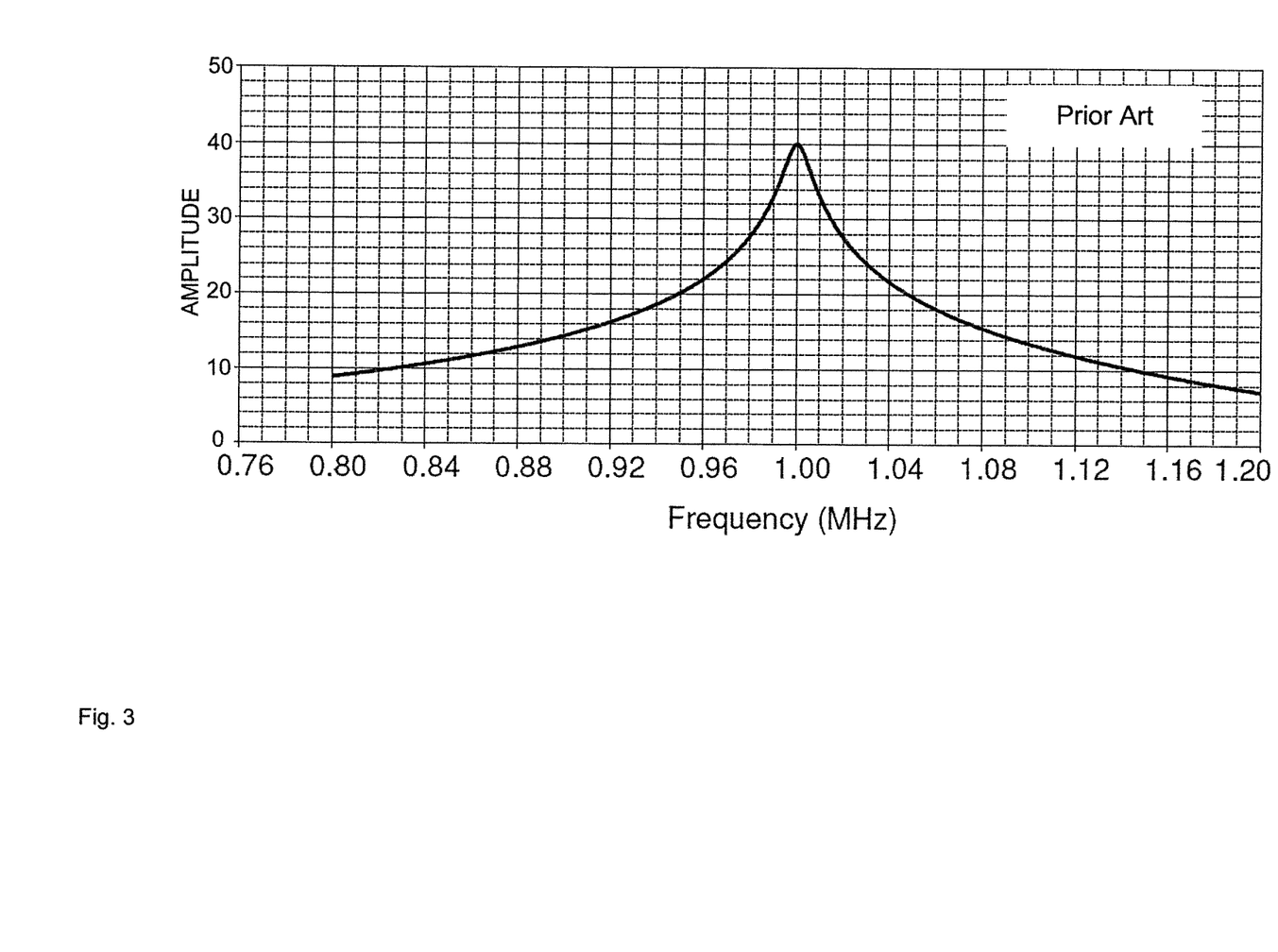
FIG. 3 depicts a bandpass curve of the circuit of FIG. 2, according to the prior art.

Furthermore, the bandpass curve of circuit 200 can be determined using Equations 1 to 5, and is depicted in FIG. 3, according to the prior art. Specifically, it is understood from FIG. 3 that circuit 200 supplies power to a quadrupole most efficiently at a peak frequency, in this instance 1 MHz, and further that the bandpass curve of circuit 200 is narrow (e.g approximately 10 kHz at −3 dB).

In addition, the response curve of circuit 200 can be modelled, as depicted in FIG. 4 according to the prior art. From FIG. 4, it is understood that response time can be as high as 40-50 μs for circuit 200 to ramp a quadrupole up to full power; furthermore, the response time is greater than 40 μs to ramp power back down. As it is generally understood that response time of an LC circuit is proportional to loaded Q/resonant frequency of the LC circuit, by reducing the loaded Q the response time can be similarly reduced.

Figure 5:
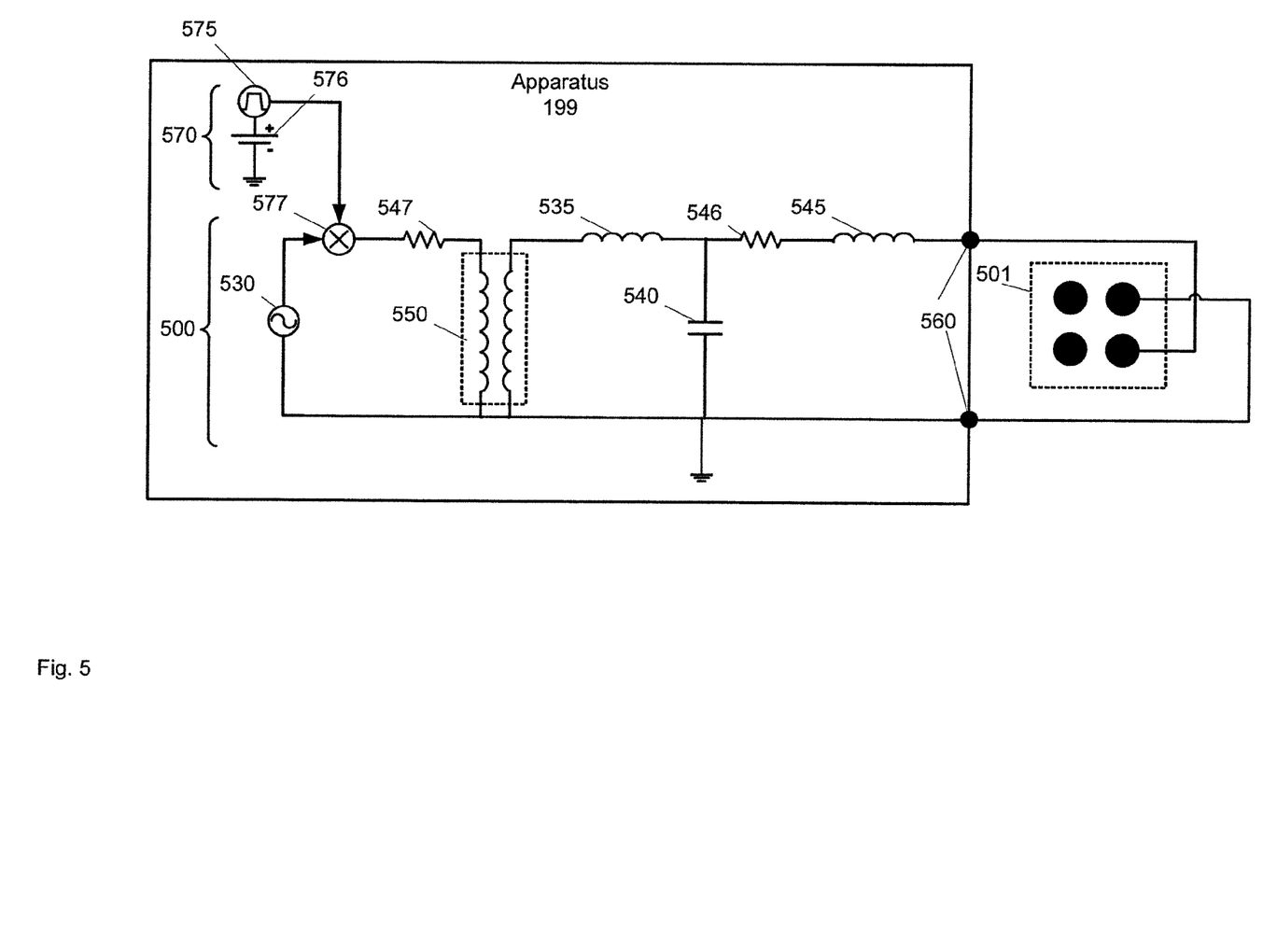
FIG. 5 depicts a schematic diagram of circuitry of an apparatus for providing power to a quadrupole in a mass spectrometer, according to non-limiting embodiments.
Figure 6:
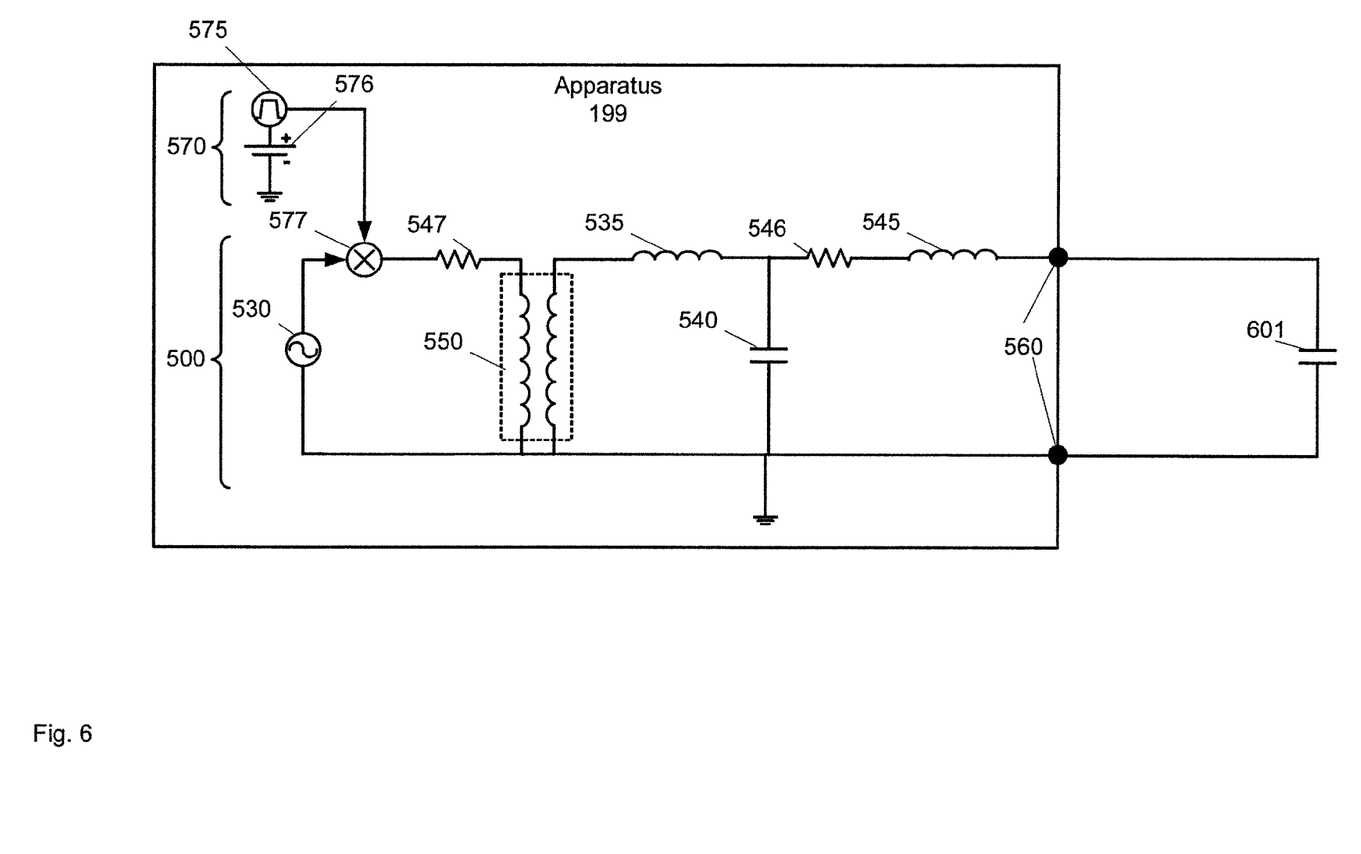
FIG. 6 depicts a schematic diagram of circuitry of the apparatus of FIG. 5, including a capacitance introduced into the circuitry due to the quadrupole, according to non-limiting embodiments.

Attention is now directed to FIG. 5, which depicts a schematic block diagram of circuit 500 in apparatus 199 for providing power to a quadrupole in a mass spectrometer, such mass spectrometer 100. Furthermore, FIG. 6 depicts a schematic block diagram of circuit 500 in apparatus 199 with, however, quadrupole 500 replaced by its equivalent capacitance 601. In some embodiments, quadrupole 140 can comprise quadrupole 501, while in other embodiments collision cell 150 can comprise quadrupole 501.

In general, circuit 500 comprises an RF power source 530 for providing an RF signal to quadrupole 501, and a first resonant LC circuit formed by inductor 535 and capacitor 540 for providing voltage gain for RF signal from RF power source 530. Circuit 500 further comprises at least one inductor 545 for forming a second resonant LC circuit with quadrupole 501, the second resonant LC circuit connected in cascade with the first resonant LC circuit, when the at least one inductor 545 is connected to quadrupole 501. Specifically, the second resonant LC circuit is formed from inductor 545 and capacitance 601 (with reference to FIG. 6), when apparatus 199 is connected to quadrupole 501. In general, the second resonant LC circuit further comprises a resistance 546, as depicted in FIGS. 5 and 6, resistance 546 being the resistance of inductor 545. Resistance 546 can be chosen to optimize the drive power and efficiency of apparatus 199.

Circuit 500 further comprises a step-up transformer 550 connected in parallel to RF power source 530 on a primary side and the first resonant LC circuit on a secondary side. The step-up transformer provides voltage gain $V_g$ for the RF signal thereby reducing the loaded Q of the resonant LC circuits, where $Q=((V_g^{1/n})-1)^{1/2}$ and $V_g$ is the voltage gain for apparatus 199 and/or circuit 500. Hence, the response time will be reduced (e.g. see FIG. 8, described below) as response time is proportional to the loaded Q. In some embodiments, circuit 500 further comprises a resistance 547, which is the output resistance of power source 530.

In some embodiments, apparatus 199 can comprise any suitable number of connectors 560 for connection to quadrupole 501. It is understood that each opposing pair of poles in quadrupole 501 is connected to a respective connector 560. While in depicted embodiments, apparatus 199 comprises two connectors 560, in alternative embodiments, apparatus 560 can comprise four connectors, one for each pole in quadrupole 501, with suitable internal wiring in apparatus 199 for placing a similar RF power signal on opposing pairs of poles in quadrupole 501.

In some embodiments, RF power source 530 operates in a range of 1-5 MHz, but can operate as low as approximately 500 kHz. In general, however, it is understood that RF power source 530 can be operated at any suitable frequency, amplitude and phase to provide power to quadrupole 501 to eject and/or filter ions. In some embodiments, RF power source 530 comprises an integrated apparatus (IC) power source.

In some embodiments, apparatus 199 further comprises a circuit 570 for providng further control of the RF signal from power supply 530. Circuit 570 can comprise at least one of a pulse generator 575 and a battery 576. Pulse generator 575 can control the amplitude of the RF via mixer 577, while battery 575 can add a constant offset to the RF signal.

In general it is understood that circuit 500 as a value of n=2, and can be modelled using any suitable circuit modelling package. It is understood that the Equations 1 to 5 can be further used to model circuit 500, for example within a suitable circuit modelling package, with the presence of step-up transformer 550 taken into account. Furthermore, in some embodiments, resistances 546 and 547 can have values in the range of 0.1 to a few ohms, inductor 535 can have a value in the range of a few µH, while inductor 545 can have a value in the range of a several hundred µH, and capacitance 540 can have a value in the range of a few nF. In these embodiments, the capacitance of quadrupole 501 (e.g. capacitance 601 of FIG. 6) is the range of ten to a hundred pF. Furthermore, transformer 550 can have any suitable combination of range of resistances and inductances; in non-limiting embodiments, the inductance of each of the primary side and secondary sides is in the range of a thousand µH. However, the exemplary ranges of the elements of apparatus 199 are not to be considered unduly limiting and indeed any suitable combination of ranges of resistances, inductances and capacitances are within the scope of present embodiments.

Figure 7:
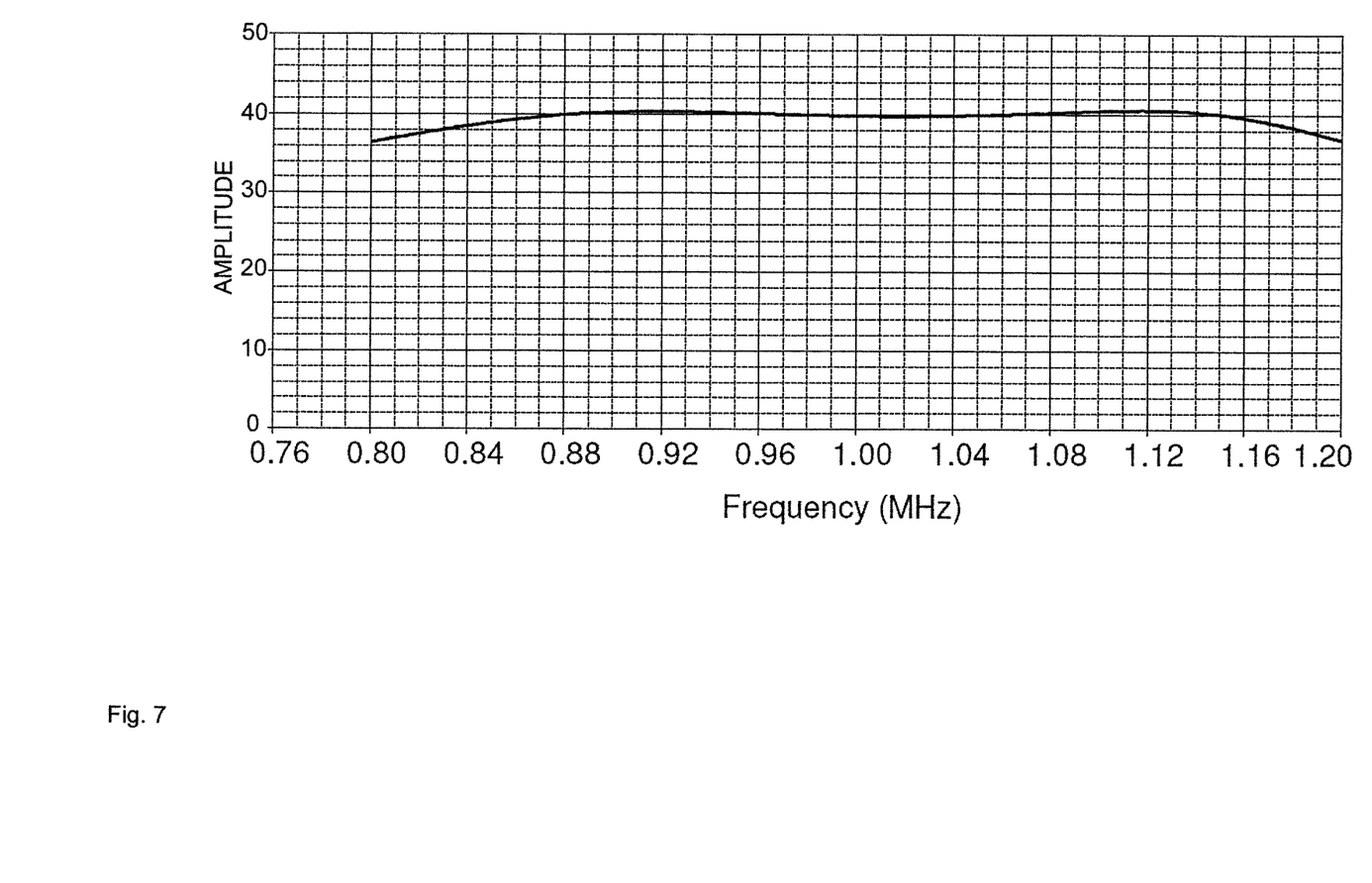
FIG. 7 depicts a bandpass curve of the circuit of FIG. 5, according to the prior art.

In any event, the bandpass curve of circuit 500 can be determined from Equations 1 to 5, with n=2, and the values of the various resistances, inductances and capacitors, and is depicted in FIG. 7, according to the prior art. From a comparison of FIGS. 3 and 7, it is understood that, as compared to circuit 200, circuit 500 has a broad bandpass curve (e.g approximately 400 kHz at −3 dB). In effect, circuit 500 is similar to circuit 200, however including step up transformer 550, and one further LC resonant circuit (i.e. n=2). Such additions result in a broadening of the bandpass curve by two orders of magnitude. It is furthermore understood that resistance 547 can determines the flatness of the bandpass curve of FIG. 7, with larger values of resistance 547 causing the bandpass curve to become more rounded.

Figure 8:
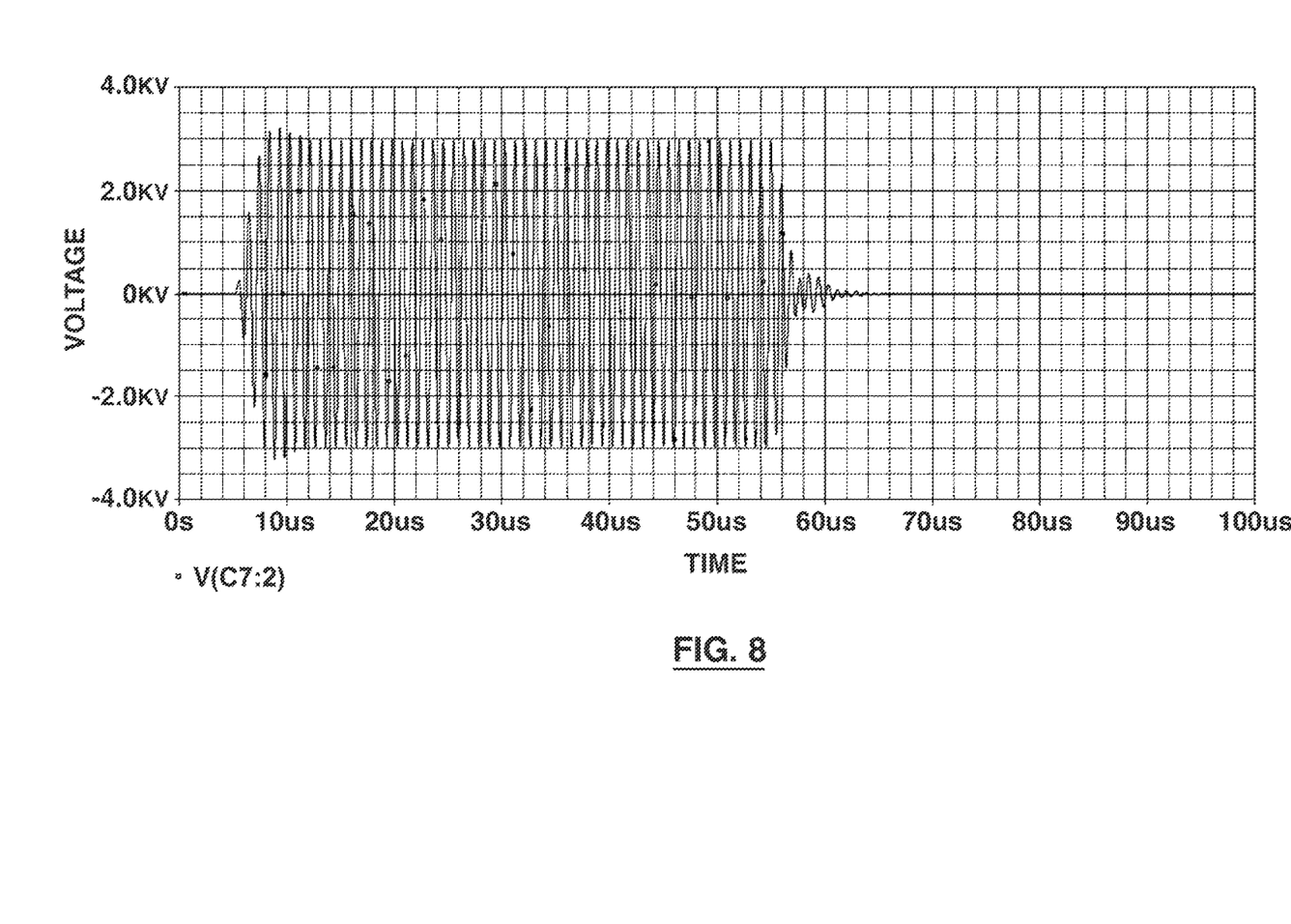
FIG. 8 depicts a response curve of the circuit of FIG. 5, according to the prior art.

Furthermore, the response curve of circuit 500 can be modelled, depicted in FIG. 8 according to non-limiting embodiments. From FIG. 8, it is understood that the response time of circuit 500 is approximately 5 µs to ramp a quadrupole up to full power, as compared to 40-50 µs for circuit 200, with a similar response time of approximately 5 µs to ramp power back down. Hence, by reducing the loaded Q, the response time is in turn reduced.

In general, it is understood that through choice of various suitable components, e.g. step-up transformer 550, resistors 545, 547, inductors 535, 545, and capacitor 540, the voltage gain of apparatus 199 can be substantially between 50 and 500. Hence, if RF power supply 530 has a maximum output of 10 V, then the maximum output of apparatus 199 can be as high as 5 kV, with a fast ramp speed of 5 µs. This is generally achieved by reducing the loaded Q of said resonant LC circuits, by using step-up transformer 550 to provide a substantial portion of the gain of circuit 500.

In some embodiments, circuit 500 can further comprising at least one further resonant LC circuit between the first resonant LC circuit and the second resonant LC circuit, the first resonant LC circuit, the at least one further resonant LC circuit, and the second resonant LC circuit connected in cascade, when inductor 545 is connected to quadrupole 501. In other words, in some embodiments n≥2.

It is further understood that circuit 500 can be controlled to power quadrupole 501, for example via processor 185 and/or an on-board processor (not depicted) in a method for providing power to a quadrupole.

Those skilled in the art will appreciate that in some embodiments, the functionality of mass spectrometer 100 and apparatus 199 can be implemented using pre-programmed hardware or firmware elements (e.g., application specific integrated circuits (ASICs), electrically erasable programmable read-only memories (EEPROMs), etc.), or other related components. In other embodiments, the functionality of mass spectrometer 100 and apparatus 199 can be achieved using a computing apparatus that has access to a code memory (not shown) which stores computer-readable program code for operation of the computing apparatus. The computer-readable program code could be stored on a computer readable storage medium which is fixed, tangible and readable directly by these components, (e.g., removable diskette, CD-ROM, ROM, fixed disk, USB drive). Alternatively, the computer-readable program code could be stored remotely but transmittable to these components via a modem or other interface device connected to a network (including, without limitation, the Internet) over a transmission medium. The transmission medium can be either a non-wireless medium (e.g., optical and/or digital and/or analog communications lines) or a wireless medium (e.g., microwave, infrared, free-space optical or other transmission schemes) or a combination thereof.

Persons skilled in the art will appreciate that there are yet more alternative implementations and modifications possible for implementing the embodiments, and that the above implementations and examples are only illustrations of one or more embodiments. The scope, therefore, is only to be limited by the claims appended hereto.

What is claimed is:

1. An apparatus for providing power to a multipole in a mass spectrometer, the apparatus comprising:
   a first resonant LC circuit;
   at least one inductor for forming a second resonant LC circuit with said multipole, said second resonant LC circuit connected in cascade with said first resonant LC circuit, when said at least one inductor is connected to said multipole;
   an RF power source for providing an RF signal; and
   a step-up transformer connected in parallel to said RF power source on a primary side and said first resonant LC circuit on a secondary side, said step-up transformer providing voltage gain for said RF signal thereby reducing the loaded Q of said resonant LC circuits.

2. The apparatus of claim 1, further comprising at least one further resonant LC circuit between said first resonant LC circuit and said second resonant LC circuit, said first resonant LC circuit, said at least one further resonant LC circuit, and said second resonant LC circuit connected in cascade, when said at least one inductor is connected to said multipole.

3. The apparatus of claim 1, wherein a capacitor in said second resonant LC circuit comprises said multipole, when said at least one inductor is connected to said multipole.

4. The apparatus of claim 1, wherein said RF power source comprises an integrated apparatus (IC) power source.

5. The apparatus of claim 1, wherein said RF power source is operable in a range of substantially 500 kHz to 5 MHz.

6. The apparatus of claim 1, wherein said voltage gain is substantially between 50 and 500.

7. The apparatus of claim 1, wherein said loaded $Q = ((Vg^{1/n})-1)^{1/2}$ and Vg is the voltage gain for said apparatus.

8. The apparatus of claim 1, wherein said multipole comprises at least one of a quadrupole, hexapole and an octopole.

9. A method for providing power to a multipole in a mass spectrometer, the method comprising:
   controlling a circuit to produce an RF signal, said circuit comprising: a first resonant LC circuit; at least one inductor for forming a second resonant LC circuit with said multipole, said second resonant LC circuit connected in cascade with said first resonant LC circuit, when said at least one inductor is connected to said multipole; an RF power source for providing an RF signal; and a step-up transformer connected in parallel to said RF power source on a primary side and said first resonant LC circuit on a secondary side, said step-up transformer providing voltage gain for said RF signal thereby reducing the loaded Q of said resonant LC circuits.

10. The method of claim 9, wherein said circuit further comprises at least one further resonant LC circuit between said first resonant LC circuit and said second resonant LC circuit, said first resonant LC circuit, said at least one further resonant LC circuit, and said second resonant LC circuit connected in cascade, when said at least one inductor is connected to said multipole.

11. The method of claim 9, wherein a capacitor in said second resonant LC circuit comprises said multipole, when said at least one inductor is connected to said multipole.

12. The method of claim 9, wherein said RF power source comprises an integrated apparatus (IC) power source.

13. The method of claim 9, further comprising operating said RF power source in a range of substantially 500 kHz to 5 MHz.

14. The method of claim 9, wherein said voltage gain is substantially between 50 and 500.

15. The method of claim 9, wherein said loaded $Q = ((Vg^{1/n})-1)^{1/2}$ and Vg is the voltage gain for said apparatus.

16. The method of claim 9, wherein said multipole comprises at least one of a quadrupole, hexapole and an octopole.

* * * * *